(12) United States Patent
Juillard

(10) Patent No.: US 8,402,250 B1
(45) Date of Patent: Mar. 19, 2013

(54) DISTRIBUTED FILE SYSTEM WITH CLIENT-SIDE DEDUPLICATION CAPACITY

(75) Inventor: Loic Juillard, Escondido, CA (US)

(73) Assignee: Applied Micro Circuits Corporation, Sunnyvale, CA (US)

( * ) Notice: Subject to any disclaimer, the term of this patent is extended or adjusted under 35 U.S.C. 154(b) by 479 days.

(21) Appl. No.: 12/699,690

(22) Filed: Feb. 3, 2010

(51) Int. Cl.
*G06F 9/34* (2006.01)
(52) U.S. Cl. .................. 711/216; 711/154; 711/E12.06
(58) Field of Classification Search .................. 711/216
See application file for complete search history.

(56) References Cited

U.S. PATENT DOCUMENTS

2011/0055471 A1\* 3/2011 Thatcher et al. .............. 711/114

\* cited by examiner

*Primary Examiner* — Kenneth Lo
(74) *Attorney, Agent, or Firm* — Turocy & Watson, LLP

(57) ABSTRACT

A system and method are provided for deduplication (dedup) of data file information in a network of distributed data filers. A host, including a metadata service (MDS) and a data node (DN), receives a block count and hash group calculations for a file from a network-connected client device. The MDS creates a file map with target addresses, and compares the calculated hash group to hash groups associated with stored blocks of data in a global dedup hash table. If a match is found, the MDS directs the client device not to send the block of data associated with matching hash group, and reallocates the address of the block of data from the target address.

20 Claims, 5 Drawing Sheets

Fig. 2

| INODE | FIRST BLOCK DESCRIPTOR | FIRST BLOCK TARGET ADDRESS | SECOND BLOCK DESCRIPTOR | SECOND BLOCK TARGET ADDRESS | ••• | nTH BLOCK DESCRIPTOR | nTH BLOCK ADDRESS |
|---|---|---|---|---|---|---|---|

MAP

Fig. 4

116a — LOCAL DEDUP HASH TABLE

| HASH | | | | ADDRESS |
|---|---|---|---|---|
| HASH 1 | HASH 2 | ••• | HASH n | |
| XX1 | zzz | ••• | yyy | 00 11 |

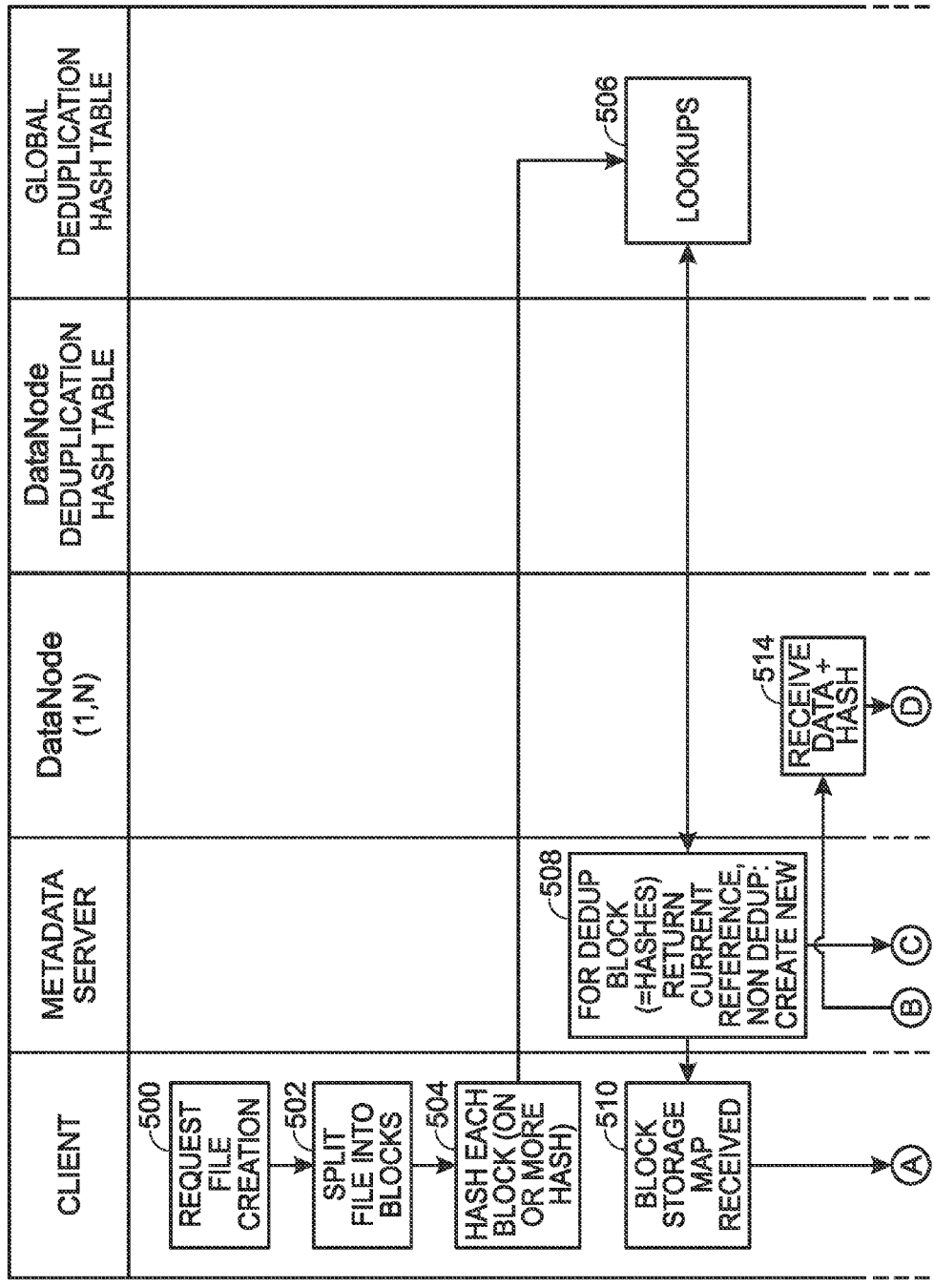

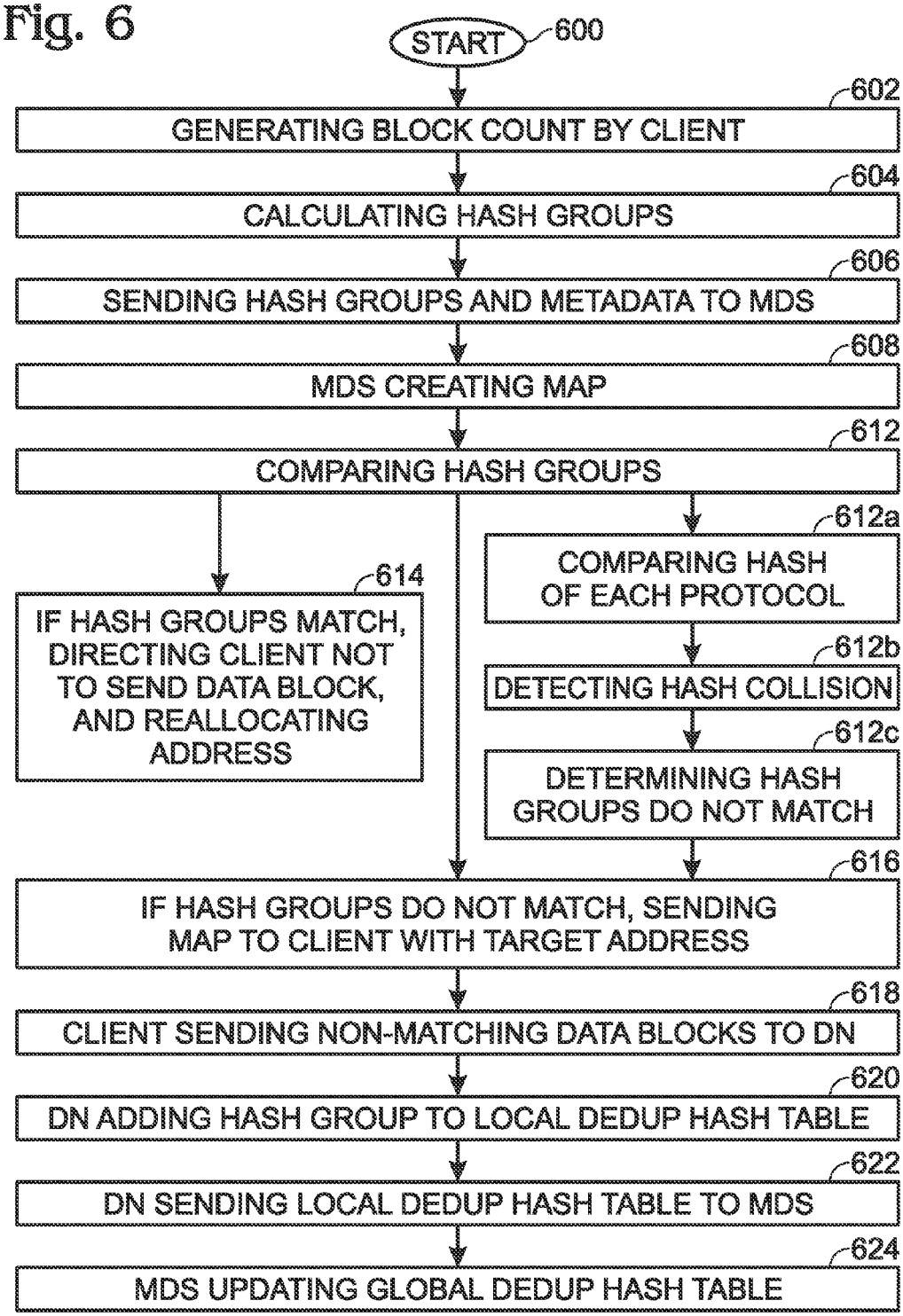

DISTRIBUTED FILE SYSTEM WITH CLIENT-SIDE DEDUPLICATION CAPACITY

BACKGROUND OF THE INVENTION

1. Field of the Invention

This invention generally relates to digital data storage and, more particularly, to a system and method for the client-side deduplication (dedup) of data being stored across a distributed network of hosts.

2. Description of the Related Art

Currently storage capacity grows at least 36% every year. In times of economic prosperity, as in the mid-2000s, storage capacity growth can reach as high as 90%. With the emergence of cloud services, storage has become a pivotal technology and is often the basis of any on-line service. As a result of the growing quality and complexity of the data and its availability on the Internet, storage capacity is likely to grow even faster in the future. Typically, cloud service providers rely on clusters of commodity equipment to deliver their service. Scale-out storage (such as a distributed file system) will represent the majority of the operating storage system as the service grows. The ability to offer data reduction in a distributed environment will be critical to the profitability of a business.

With a growth in capacity comes a need for more drive into a storage shelf and, therefore, more electric power. Since a large majority of data is duplicate, and it should be unnecessary to spend resources to save copies of data already in storage. For example, a customer may generate weekly graph reports of their operations. Typically, the graph report contains the same information from one week to another. By using deduplication, a storage device can eliminate redundant blocks of data and replace them with a pointer to a common block.

As noted in Wikipedia, data deduplication is a specific form of compression where redundant data is eliminated, typically to improve storage utilization. In the deduplication process, only one copy of the data is stored. However, the indexing of all data is retained should that data ever be required. Deduplication is able to reduce the required storage capacity since only the unique data is stored. For example, a typical email system might contain 100 instances of the same one megabyte (MB) file attachment. If the email platform is backed up or archived, all 100 instances are saved, requiring 100 MB storage space. With data deduplication, only one instance of the attachment is actually stored; each subsequent instance is just referenced back to the one saved copy. In this example, a 100 MB storage demand is reduced to only 1 MB. Different applications have different levels of data redundancy. Backup applications generally benefit the most from de-duplication due to the nature of repeated full backups of an existing file system.

In addition to saving disk space; acquisition costs, power, and cooling requirements are reduced, making a disk suitable for first stage backup and restore, and for retention that can easily extend to months. Also, restore service levels are higher, media handling errors are reduced, and more recovery points are available on fast recovery media. Advantageously, data deduplication reduces the data that must be sent across a network for remote backups, replication, and disaster recovery.

Deduplication solutions work by comparing chunks (blocks) of data to detect duplicates. Each block of data is assigned a presumably unique identification, calculated by the software, typically using cryptographic hash functions. A requirement of these functions is that if the data is identical, the identification is identical. Therefore, if the software sees that a given identification already exists in the deduplication namespace, then it will replace that duplicate chunk with a link. Upon read back of the file, wherever a link is found, the system simply replaces that link with the referenced data chunk. The de-duplication process is intended to be transparent to end users and applications.

In some systems, blocks are defined by physical layer constraints (e.g., 4 KB block size in write anywhere file layout (WAFL)). In some systems only complete files are compared, which is called Single Instance Storage or SIS. The most intelligent (but CPU intensive) method is sliding-block. In sliding block, a window is passed along the file stream to seek out more naturally occurring internal file boundaries.

Source deduplication ensures that data on the data source is deduplicated. This generally takes place directly within a file-system. The file system periodically scans new files creating hashes, and compares them to hashes of existing files. When files with the same hashes are found, the file copy is removed and the new file points to the old file. Unlike hard links however, duplicated files are considered to be separate entities. If one of the duplicated files is later modified, then a copy of the file is written or a changed block is created. Target deduplication is the process of removing duplicates of data in the secondary store. Generally this is a backup store such as a data repository or a virtual tape library.

There are three different ways performing the deduplication process. In a client backup deduplication, the deduplication hash calculations are initially created on the source (client) machines. Files that have identical hashes to files already in the target device are not sent, the target device just creates appropriate internal links to reference the duplicated data. The benefit of the client backup approach is that the unnecessarily sending of data across a network is avoided, thereby reducing traffic load.

With post-process deduplication, new data is first stored on the storage device and then a process, at a later time, analyses the data looking for duplication. The benefit to this approach is that there is no need to wait for the hash calculations and lookup to be completed before storing the data, thereby ensuring that store performance is not degraded. Solutions offering policy-based operation can give users the ability to defer optimization on "active" files, or to process files based on type and location. One potential drawback is that duplicate data may be unnecessarily stored for a short time, which is an issue if the storage system is near full capacity. Another issue is the unpredictability of knowing when the process will be completed.

In-line deduplication is a process where the deduplication hash calculations are created on the target device as the data enters the device in real-time. If the device spots a block that it already stored on the system, it does not store the new block, just references it to the existing block. The benefit of in-line deduplication over post-process deduplication is that it requires less storage, as data is not duplicated. On the negative side, it is frequently argued that because hash calculations and lookups takes so long, data ingestion can be slower, thereby reducing the backup throughput of the device.

Since most data deduplication solutions are slow, they are more suited to secondary storage in an offline mode. This typically includes the backup process, which can be done in batch offline mode. Most of the post-processing systems fall into this category.

Data deduplication solutions rely on cryptographic hash functions for identification of duplicate segments of data. A hash collision may result in data loss if a block of data is replaced by incorrect data. To address this problem, very large hash values may be used, so that statistically there is a far greater chance of hardware failure than a hash collision. Solutions utilizing post-process architectures may offer bit-for-bit validation prior to garbage collection of original data for guaranteed data integrity. Some examples of hash algorithms include MD5, SHA-1, and SHA-256.

Another major drawback of data deduplication is the intensive computation power required. For every file or block of data, all the bytes are used to compute a hash value. The hash then needs to be looked up to see if it matches existing hashes. To improve performance, a system may use a combination of weak and strong hashes. Weak hashes are much faster to calculate, but there is a greater chance of a hash collision. Systems that utilize weak hashes may subsequently calculate a strong hash, and use the strong hash as the determining factor as to whether data blocks are the same. The system overhead associated with calculating and looking up hash values is primarily a function of the deduplication workflow. The "rehydration" of files does not require this processing and any incremental performance penalty associated with re-assembly of data chunks is unlikely to impact application performance.

Scaling has also been a challenge for deduplication systems because the hash table needs to be shared across storage devices. If there are multiple disk backup devices in an infrastructure with discrete hash tables, then space efficiency is adversely affected. A hash table shared across devices—a global dedup hash table—preserves space efficiency, but is technically challenging from a reliability and performance perspective.

Thus, there is currently no practical ability to deduplicate data blocks in a cluster file system. Some vendors, such as NetApp, run their storage in an active-active fashion. Deduplication is offered on both systems even during a failover only because the deduplication table is written in two storage controllers for each transaction. Such a process is wasteful of bandwidth and processing resources. Further, deduplication technology typically focuses on eliminating the redundancy once the data are on the storage device. Most clients, however, are limited to 1 gigabit per second (Gbs) throughput, and the overall process is slowed by the communication dedup data that is not stored.

It would be advantageous if there was a practical means of performing deduplication across a distributed infrastructure of network-connected hosts.

SUMMARY OF THE INVENTION

Accordingly, a method is provided for client-side deduplication (dedup) of data file information in a network of distributed data filers. A client device generates a block count for a first file, and calculates a hash group for each block of data, where the hash group includes a hash of the data performed using a plurality of hash protocols. The client device sends the calculated hash groups and first file metadata to a network-connected host including a first metadata service (MDS) and a first data node (DN). The MDS creates a first file map including a target address in the first DN, associated with each block of data. The MDS compares the calculated hash groups, to hash groups associated with stored blocks of data in a global dedup hash table cross-referencing the hash group for each block of data stored in a distributed network of hosts, to stored block addresses. If a hash group match is found, the first MDS directs the client device not to send the block of data (matching data block) associated with the matching hash group for storage. The MDS reallocates the address of the matching data block in the global dedup hash table, from the target address, to the address of the stored block of data with the matching hash group.

If a hash group match in not found (non-matching data block), the MDS sends the first map to the client device with a target address in the first DN associated with the non-matching data block. Then, the client device sends non-matching data block to the target address in the DN. The DN adds the hash group associated with the non-matching data block to a local dedup hash table, cross-referenced to the target address. Finally, the DN sends the local dedup hash table to the MDS, and the MDS updates the global dedup hash table with the local dedup hash table.

Additional details of the above-described method, and a system for the client-side deduplication of file data in a distributed network of hosts, are provided below.

BRIEF DESCRIPTION OF THE DRAWINGS

FIG. 2 is a drawing of an exemplary file map.

FIG. 3 is a diagram of an exemplary global dedup hash table.

FIG. 4 is a diagram of an exemplary local dedup hash table.

FIGS. 5A and 5B are diagrams describing a client-side deduplication process flow in a distributed file system.

FIG. 6 is a flowchart illustrating a method for the client-side dedup of data file information in a network of distributed data filers.

DETAILED DESCRIPTION

Figure 1:
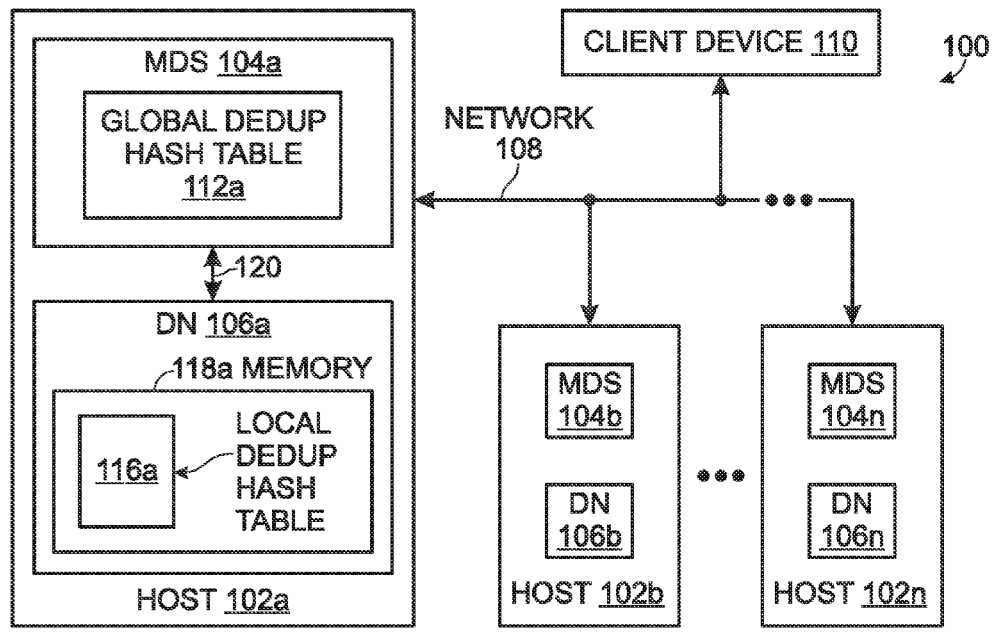
FIG. 1 is a schematic block diagram of a system for the client-side deduplication (dedup) of file data in a distributed network of hosts.

As used in this application, the terms "component," "module," "system," and the like are intended to refer to an automated computing system entity, such as hardware, firmware, a combination of hardware and software, software, software stored on a computer-readable medium, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The devices described below may employ a computer system with a bus or other communication mechanism for communicating information, and a processor coupled to the bus for processing information. The computer system may also includes a main memory, such as a random access memory (RAM) or other dynamic storage device, coupled to the bus for storing information and instructions to be executed by processor. These memories may also be referred to as a computer-readable medium. For simplicity, all the memories associated with any particular device are shown as one element. The execution of the sequences of instructions contained in a computer-readable medium may cause a processor to perform some of the steps associated with the deduplication functions. Alternately, these functions, or some of these functions may be performed in hardware. The practical implementation of components of the system as a computer system would be well known to one with skill in the art.

As used herein, the term "computer-readable medium" refers to any medium that participates in providing instructions to a processor for execution. Such a medium may take many forms, including but not limited to, non-volatile media, volatile media, and transmission media. Non-volatile media includes, for example, optical or magnetic disks. Volatile media includes dynamic memory. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

As used herein, the network-connected devices (hosts and clients) may also be referred to as remote devices. The term "remote" is not defined by geographical location or network protocol. For example, a local area network (LAN) or intranet may connect devices that are proximity located. In another aspect, the devices may be connected through a wide area network (WAN), using an Ethernet protocol for example. Elements in the WAN network may be separated by thousands of miles and communicate via the Internet, in which case the messages mentioned herein may be digitally enveloped in successive protocol layers and carried via a synchronous optical network (SONET) network. Communicating devices are not to be considered as remote or local based upon the protocol being used to support communications.

Rather, the term "remote" defines entities that have separate identities, names, or legal standing. Further, as explained in more detail below, the remote hosts are independent devices able to fully function without the participation of other hosts in the system. While data nodes and metadata service devices may be local components within a host, they may also be distributed over a wide geographical area and connected via a network. On the other hand, hosts may be physically co-located, but considered to be remote from each other, if they perform deduplication functions independent of each other.

Although it would be possible to build the above-described systems exclusively from hardware, some of the modules may be software applications stored in memory, and connected to a microprocessor via a data/address bus. In that case, the modules are enabled as software instructions that are executed by the microprocessor. Alternately (not shown), an operating system (OS) is used to manage metadata service and data node modules, as well as other applications (not shown), such as might be embedded in a personal computer or server.

FIG. 1 is a schematic block diagram of a system for the client-side deduplication (dedup) of file data in a distributed network of hosts. The system 100 comprises a first host 102a including a first metadata service (MDS) 104a and a first data node (DN) 106a. The first MDS 104a has an interface on line 108 network-connected to client device 110 for receiving calculated data block hash groups and metadata for a first file. A hash group is defined herein as a hash of the data performed using a plurality of hash protocols. The first MDS 104a creates a first map with target addresses associated with each data block in the first file, and adds the first map to a global dedup hash table 112a cross-referencing hash groups for each block of data stored in a distributed network of hosts, to stored block descriptors and stored block addresses. More explicitly, the first file map includes an inode number identifying the first file, and a block descriptor and a target block address, associated with each block of data. The global dedup hash table 112a is stored in a computer-readable medium or memory 114. The first MDS 104a compares the calculated hash group to hash groups associated with stored blocks of data, and if a hash group match is found, the first MDS 104a sends the first map to the client device with directions not to send the block of data associated with matching hash group (matching data block). The first MDS 104a also reallocates (sets a pointer) the address of the matching data block in the global dedup hash table, from the target address, to the address of the stored block of data with the matching hash group. Alternately, the first MDS 104a may perform the hash comparison and address reallocation functions prior to adding the (modified) first map into the global dedup hash table.

The first data node (DN) 106a has a memory 118a and a local dedup hash table 116a cross-referencing hash groups to data block addresses in the memory 118a. The first DN 106a has an interface on line 108 to the client device 110 for receiving blocks of data to be stored in memory target addresses. Here the first DN 106a and first MDS 104a are shown connected via a dedicated network on line 120. Alternately however, they could communicate via the network on line 108.

The first map is sent by the first MDS 104a to the client device 110 and it includes a target address in the first DN 106a for a block of data (non-matching data block), if a hash group match is not found in the global dedup hash table 112a. When the first DN 106a receives the non-matching data block from the client device, it stores the non-matching data block at the target address. The first DN 106a adds the hash group associated with the non-matching data block to the local dedup hash table 116a, cross-referenced to the target address, and sends the local dedup hash table 116a to the first MDS 104a. The first MDS 104a updates the global dedup hash table 112a with the local dedup hash table 116a. For matching data blocks, the target address in the map sent to the client device by the first MDS 104a is left blank, signifying to the client device 110 that the matching data block need not be transmitted to the first DN 106a.

Although only a single client device 110 is shown, it should be understood that the system 100 is typically connected to a plurality of clients. The client device 110 calculates data block hash groups for the first file, and sends the calculated hash groups, with metadata, to the first MDS 104a. As noted above, the client device receives the first map from the first MDS 104a and sends non-matching data blocks to the first DN 106a, for storage at the target addresses assigned in the first map. The client device 110 sends first file metadata such as the number of data blocks in the file, file name, owner, group owner, permissions, access control, and combinations of the above-listed metadata.

FIG. 2 is a drawing of an exemplary file map. Note: the system of FIG. 1 is not limited to the explicit map structure depicted in FIG. 2. In some aspects, the blocks may be given unique identification numbers. Alternately, a block may be identified by its position in a sequence of blocks in a file, where the file is identified by an inode number. It should be noted that the first MDS 104a need not necessarily send a complete map to the client device. For example, there is no need to send the inode number for the first file, unless the client device is attempting to store a plurality of files.

Returning to FIG. 1, the DN 106a need not necessarily send the entire local dedup hash table when the global dedup hash table is updated, as this would be wasteful of communication bandwidth and MDS processing and storage resources. Rather, an abridged or modified version of the local dedup hash table 116a is sent. The local dedup hash table 116a may be modified using a most used or most recently used hash group algorithm, for example. However, this is not an exhaustive list of possible algorithms.

FIG. 3 is a diagram of an exemplary global dedup hash table. Note: the system of FIG. 1 is not limited to any particular table layout. Further, a typical hash table may have more fields than shown in the figure. Continuing the example above, the client device sends non-matching data blocks for the first file identified as inode 1. It is unnecessary to store block 1, since the hash matches block 3 of inode 4, already stored in host 2. However, no hash match is found for block 2 of inode 1, and it is stored at the target address (host 1, DN address 0011).

FIG. 4 is a diagram of an exemplary local dedup hash table. Note: the system of FIG. 1 is not limited to any particular table layout. Further, a typical hash table may have more fields than shown in the figure. Continuing the example of FIGS. 1-3, the hash group and address of block 2 of inode 1 is shown. The address is both the target address and the actual address in the memory of the first DN, since no matching hash groups were found by the first MDS.

Returning to FIG. 1, in one aspect the first MDS 104a compares a hash of each protocol in a calculated hash group to a hash of a corresponding protocol in a hash group associated with a stored block of data. If a hash collision is detected, where the hash of at least one protocol, but not every protocol in the group matches, it is determined that the hash groups do not match. If the hash groups do not match, it is assumed that the data block at issue is not already stored in system memory. Thus, the data block is stored in the target address in the memory 118a of the first DN 106a.

The system 100 further comprises a plurality of network hosts. Shown are hosts 102b through 102n, where n is a variable not limited to any particular value. Each host 102 includes an MDS 104 with a global dedup hash table (not shown), and a DN 106 with a local dedup hash table and memory (not shown). The first DN 106a sends the local dedup hash table 112a to each host MDS 104 in the distributed network, and each host MDS 104 updates their global dedup hash table 112.

It should be remembered that when the first MDS compares hash groups, a comparison is being made to the hashes for blocks being stored in all the nodes in the system, not just the blocks stored in the first node. Therefore, the first MDS 104a may reallocate the address of the received block of data to the address of the stored block of data in a second network-connected host 102b if a hash group match is found for a stored block of data in the second host 102b.

The plurality of hosts (and client device 110) may be connected via a wide area network (WAN), local area network (LAN), or metro area network MAN. However, this is not an exhaustive list of network types. The hosts are connected in a distributed system that is network connected with the understanding that the hosts are independent stand-alone devices that can operate without assistance from other hosts in the system. Such an arrangement of independent hosts differentiates the system 100 from a server controlling a plurality of memory devices, as the memory devices (e.g., data nodes) being controlled by a server cannot operate (perform a full range of read/write backup functions) without the assistance of the server.

Functional Description

In the distributed file system of FIG. 1, all the nodes are able to transfer and receive data between each other. The checksum (hash) processes are well known in the art. The data node is a system member (e.g., a server) of a cluster responsible for storing the data onto a disk. The metadata server is a process often implemented in a separate device that is responsible for storing the file administrative information such as the size, location of the blocks, name, and access path. A storage cluster (host) is a combination of devices configured to provide the storage service.

A hash collision refers to the case where two or more hash entries are equal, but yet the data used to seed the hash is different. To resolve this condition, the dedup algorithm may use multiple hash algorithms, or perform a full byte-for-byte comparative analysis, before concluding that two block are equal. Typically then, a hash table can be made of a collection of hash entries generated by a number of different hash algorithm. However, it would be possible to use just a single hash, trading surety for processing speed.

The overall solution revolves around two distinct processes. Each data node is responsible for maintaining a deduplication hash table for the data located locally on the data node. A global deduplication hash table is maintained centrally, containing references to the deduplicated blocks hash codes and associated block node owner.

Figure 5B:
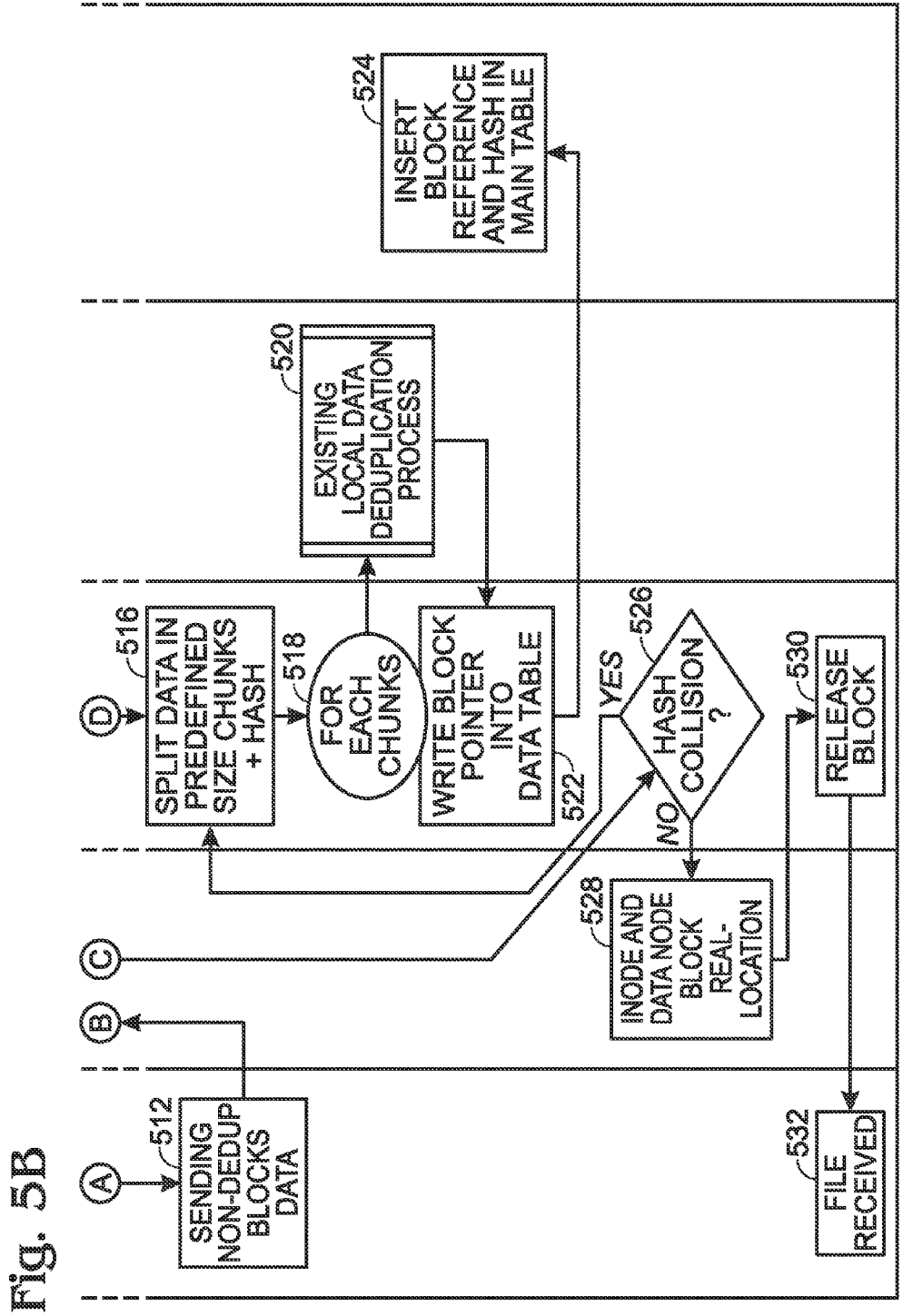

FIGS. 5A and 5B are diagrams describing a client-side deduplication process flow in a distributed file system. In Step 500 the client device creates a file, and in Step 502 the file is split into blocks. In Step 504 the client device generates a hash group for each data block, and these hash groups are sent to the MDS. The MDS generates a map, with target addresses for the blocks. In Step 506 the MDS accesses the global dedup hash table, and in Step 508 calculated hashed are compared to the hash groups in the table. At this point the map is modified to remove target addresses associated with the matching hash groups, and the modified map is sent to the client device in Step 510. In Step 512 the client device sends the non-matching data blocks (and hash groups) to the DN, which are received in Step 514. In Steps 516 through 522, the non-matching data blocks are stored in memory and the local dedup hash table is updated. In Step 524 the global dedup hash table is updated with the local dedup hash table. If a hash match is found in Step 508, Step 526 checks for hash collisions. If a hash collision is detected, the process returns to step 516. Otherwise, the MDS reallocates the target address to the block address with the matching hash in Step 528. In Steps 530 and 532 the DN invalidates the block and lets the client know that the file or block was successfully written.

FIG. 6 is a flowchart illustrating a method for the client-side dedup of data file information in a network of distributed data filers. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Typically however, the steps are performed in numerical order. The method starts at Step 600.

In Step 602 a client device generates a block count for a first file. In Step 604 the client device calculates a hash group for each block of data, where the hash group includes a hash of the data performed using a plurality of hash protocols. In Step 606 the client device sends the calculated hash groups and the first file metadata to a network-connected first host including a first MDS and a first DN. In one aspect, metadata includes information such as the number of data blocks in the file, file name, owner, group owner, permissions, access control, and combinations of the above-listed metadata. For example, a portable operating system interface [for Unix] (POSIX) protocol may be used. In Step 608 the first MDS creates a first file map including a target address in the first DN, associated with each block of data. In Step 612 the first MDS compares the calculated hash groups, to hash groups associated with stored blocks of data in a global dedup hash table cross-referencing the hash group for each block of data stored in a distributed network of hosts, to stored block addresses. In one aspect, the first MDS adds the first map to a global dedup hash table for a plurality of hosts distributed in a network such as a wide area network (WAN), local area network (LAN), or metro area network MAN.

If a hash group match is found (Step 614), the first MDS directs the client device not to send the block of data (matching data block) associated with the matching hash group for storage. The first MDS also reallocates the address of the matching data block in the global dedup hash table, from the target address, to the address of the stored block of data with the matching hash group.

If a hash group match is not found (non-matching data block) in Step 616, the first MDS sends the first map to the client device with a target address in the first DN associated with the non-matching data block. In Step 618 the client device sends non-matching data block to the target address in the first DN. In Step 620 the first DN adds the hash group associated with the non-matching data block to a local dedup hash table, cross-referenced to the target address. In Step 622 the first DN sends the local dedup hash table to the first MDS. In one aspect, Step 622 sends a modified or abridged local dedup hash table that has been modified, for example, using an algorithm such as most used hash groups or most recently used hash groups. In Step 624 the first MDS updates the global dedup hash table with the local dedup hash table.

In one aspect, sending the local dedup hash table to the first MDS in Step 622 includes the first DN sending the local dedup hash table to each host MDS in the network. Then, updating the global dedup hash table with the local dedup hash table in Step 624 includes each host MDS updating their global dedup hash table.

It should be remembered that when the first MDS compares hash groups (Step 612), a comparison is being made to the hashes for blocks being stored in all the nodes in the system, not just the blocks stored in the first node. Thus, reallocating the address of the received block of data in Step 614 may include the first MDS reallocating the address of the matching data block to the address of a stored block of data in a second network-connected host, if a hash group match is found for the stored block of data in the second host.

In one aspect, comparing the calculated hash group for each received block of data in Step 612 includes substeps. Step 612a compares a hash of each protocol in a calculated hash group to a hash of a corresponding protocol in a hash group associated with a stored block of data. If a hash collision is detected in Step 612b, where the hash of at least one protocol, but not every protocol in the group matches, then Step 612c determines that the hash groups do not match in response to detecting the hash collision.

A system and method has been presented for the client-side deduplication of data files in a network of distributed data filers. Examples of particular modules and process flows have been given to illustrate the invention. However, the invention is not limited to merely these examples. Although the invention has been presented in the context of client-side dedup, it should be understood that it is also applicable to post-processing systems. Other variations and embodiments of the invention will occur to those skilled in the art.

I claim:

1. In a network of distributed data filers, a method for client-side deduplication (dedup) of data file information, the method comprising:
    a client device calculating a hash group for each block of data in a first file, where the hash group comprises a hash of the data performed using a plurality of hash protocols;
    the client device sending the calculated hash groups and first file metadata to a network-connected first host comprising a first metadata service (MDS) and a first data node (DN);
    the first MDS creating a first file map comprising a target address in the first DN, associated with each block of data; and
    the first MDS comparing the calculated hash groups to hash groups associated with stored blocks of data in a global dedup hash table which cross-references the hash group for each block of data stored in a distributed network of hosts to stored block addresses, wherein the first MDS of the first host sends the first file map to the client device with directions not to send a block of data associated with a matching group (matching data block) for storage if a hash group match is found.

2. The method of claim 1 further comprising:
    if a hash group match is not found (non-matching data block), the first MDS of the first host sending the first map to the client device with a target address in the first DN associated with the non-matching data block:
    the client device sending non-matching data block to the target address in the first DN;
    the first DN adding the hash group associated with the non-matching data block to a local dedup hash table, cross-referenced to the target address;
    the first DN sending the local dedup hash table to the first MDS; and,
    the first MDS updating the global dedup hash table with the local dedup hash table.

3. The method of claim 2 wherein sending the local dedup hash table to the first MDS comprises sending a modified local dedup hash table, modified using an algorithm comprising most used or most recently used hash groups.

4. The method of claim 2 wherein sending the local dedup hash table to the first MDS comprises the first DN sending the local dedup hash table to each host MDS in the network; and,
    wherein the first MDS updating the global dedup hash table with the local dedup hash table comprises each host MDS updating their global dedup hash table.

5. The method of claim 4 further comprising:
    the first MDS reallocating the address of the matching data block to the address of a stored block of data in a second network-connected host, if a hash group match is found for the stored block of data in the second network-connected host.

6. The method of claim 1 wherein the first MDS comparing the calculated hash group to the hash groups associated with the stored blocks of data comprises:
    comparing a hash of each protocol in the calculated hash groups to a hash of a corresponding protocol in the hash groups associated with the stored blocks of data;
    detecting a hash collision, where the hash of at least one protocol, but not every protocol in the group matches; and
    in response to detecting the hash collision, determining that the hash groups do not match.

7. The method of claim 1 wherein the first MDS comparing the calculated hash groups, to hash groups associated with stored blocks of data in the global dedup hash table comprises comparing calculated hash groups to hash groups stored in a global dedup hash table for hosts distributed in a network comprised of wide area network (WAN), local area network (LAN), or metro area network MAN.

8. The method of claim 1 wherein the client device sending the calculated hash groups and first file metadata comprises sending metadata comprising the number of data blocks in the file, file name, owner, group owner, permissions, access control, or combinations of the above-listed metadata.

9. A system for client-side deduplication (dedup) of file data in a distributed network of hosts, the system comprising:
   a first host comprising:
   a first metadata service (MDS) having an interface to a network-connected client device for receiving calculated data block hash groups and metadata for a first file, where a particular hash group comprises a hash of the data performed using a plurality of hash protocols, the first MDS creating a first map with target addresses associated with each data block in the first file, and comparing the calculated hash groups to hash groups associated with stored blocks of data in a global dedup hash table which cross-references hash groups for each block of data stored in a distributed network of hosts to stored block addresses, wherein the first MDS of the first host sends the first map to the client device with directions not to send a block of data associated with a matching hash group (matching data block) if a hash group match is found; and,
   a first data node (DN) having a memory and a local dedup hash table cross-referencing hash groups to data block addresses in the memory, and an interface to the client device for receiving blocks of data to be stored in memory target addresses.

10. The system of claim 9 wherein the first map, sent by the first MDS to the client device, comprises a target address in the first DN for a block of data (non-matching data block), if a hash group match is not found in the global dedup hash table;
   wherein the first DN receives the non-matching data block from the client device, stores the non-matching data block at the target address, adds the hash group associated with the non-matching data block to the local dedup hash table, cross-referenced to the target address, and sends the local dedup hash table to the first MDS; and,
   wherein the first MDS updates the global dedup hash table with the local dedup hash table.

11. The system of claim 10 wherein the first DN sends a modified local dedup hash table, modified using an algorithm comprising most used or most recently used hash groups.

12. The system of claim 9 further comprising:
   a plurality of network hosts, each host comprising an MDS with a global dedup hash table and a DN with a local dedup hash table and memory;
   wherein the first DN sends the local dedup hash table to each host MDS in the distributed network; and,
   wherein each host MDS updates their global dedup hash table in response to receiving the local dedup hash table from the first DN.

13. The system of claim 9 further comprising:
   if a hash group match is found, the first MDS of the first host reallocating the address of the matching data block in the global dedup hash table, from the target address, to the address of the stored block of data with the matching hash group,
   wherein the first MDS reallocates the address of the matching data block to the address of a stored block of data in a second network-connected host, if a hash group match is found for the stored block of data in the second network-connected host.

14. The system of claim 9, wherein the first MDS compares a hash of each protocol in the calculated hash groups to a hash of a corresponding protocol in the hash groups associated with the stored blocks of data, and if a hash collision is detected, where the hash of at least one protocol, but not every protocol in the group matches, the first MDS determining that the hash groups do not match.

15. The system of claim 12 wherein the plurality of hosts are connected in a network comprising wide area network (WAN), local area network (LAN), or metro area network MAN.

16. The system of claim 10 further comprising:
   a client device network-connected to the first host, the client device calculating data block hash groups for the first file, and sending the calculated hash groups, with metadata, to the first MDS, the client device receiving the first map from the first MDS and sending non-matching data blocks to the first DN, for storage at the target addresses assigned in the first map.

17. The system of claim 9 wherein the client device sends first file metadata comprising the number of data blocks in the file, file name, owner, group owner, permissions, access control, or combinations of the above-listed metadata.

18. A system for client-side deduplication (dedup) of file data in a distributed network of hosts, the system comprising:
   a first host comprising:
   a first metadata service (MDS) having an interface to a network-connected client device for receiving calculated data block hash groups and metadata for a first file, where a particular hash group comprises a hash of the data performed using a plurality of hash protocols, the first MDS creating a first map with target addresses associated with each data block in the first file, and comparing the calculated hash groups to hash groups associated with stored blocks of data in a global dedup hash table which cross-references hash groups for each block of data stored in a distributed network of hosts to stored block addresses, wherein the first MDS of the first host sends the first map to the client device with directions not to send a block of data associated with a matching hash group (matching data block) if a hash group match is found; and,
   a first data node (DN) having a memory and a local dedup hash table cross-referencing hash groups to data block addresses in the memory, and an interface to the client device for receiving blocks of data to be stored in memory target addresses,
   the client device sends first file metadata comprising the number of data blocks in the file, file name, permissions, or access control of the above-listed metadata.

19. The system of claim 18 wherein the first map, sent by the first MDS to the client device, comprises a target address in the first DN for a block of data (non-matching data block), if a hash group match is not found in the global dedup hash table;
   wherein the first DN receives the non-matching data block from the client device, stores the non-matching data block at the target address, adds the hash group associated with the non-matching data block to the local dedup hash table, cross-referenced to the target address, and sends the local dedup hash table to the first MDS; and, wherein the first MDS updates the global dedup hash table with the local dedup hash table.

20. The method of claim 1 further comprising:

if a hash group match is found, the first MDS of the first host:

reallocating the address of the matching data block in the global dedup hash table from the target address to the address of the stored block of data with the matching hash group.

* * * * *